United States Patent
Nannoni et al.

(10) Patent No.: US 9,441,492 B2
(45) Date of Patent: Sep. 13, 2016

(54) AIRCRAFT ROTOR BLADE AND RELATIVE FORMING METHOD

(71) Applicant: AGUSTAWESTLAND S.p.A., Samarate (IT)

(72) Inventors: Fabio Nannoni, Samarate (IT); Francesco Scapinello, Samarate (IT); Giuseppe Manenti, Samarate (IT)

(73) Assignee: AGUSTAWESTLAND S.P.A., Samarate (IT)

( * ) Notice: Subject to any disclaimer, the term of this patent is extended or adjusted under 35 U.S.C. 154(b) by 867 days.

(21) Appl. No.: 13/761,299

(22) Filed: Feb. 7, 2013

(65) Prior Publication Data

US 2014/0212293 A1    Jul. 31, 2014

(30) Foreign Application Priority Data

Feb. 9, 2012  (EP) .................................... 12425026

(51) Int. Cl.
   *F01D 5/30*   (2006.01)
   *B64C 27/473*   (2006.01)
   *B64C 27/48*   (2006.01)

(52) U.S. Cl.
   CPC ............... *F01D 5/30* (2013.01); *B64C 27/473* (2013.01); *B64C 27/48* (2013.01); *Y10T 29/49336* (2015.01)

(58) Field of Classification Search
   CPC ....... F01D 5/30; B64C 27/48; B64C 27/473; B64C 2027/4736; B64C 27/32; Y10T 29/49336; B29C 70/083
   See application file for complete search history.

(56) References Cited

U.S. PATENT DOCUMENTS

| | | | | |
|---|---|---|---|---|
| 3,476,484 A * | 11/1969 | Brunsch Klaus | ....... | B64C 27/48 416/230 |
| 3,669,566 A * | 6/1972 | Bourquardez | ..... | B29D 99/0025 416/134 A |
| 3,950,115 A * | 4/1976 | Euler | ................... | B29C 70/083 244/123.6 |
| 4,012,169 A * | 3/1977 | Mouille | .................. | B64C 27/33 416/134 A |
| 4,255,087 A * | 3/1981 | Wackerle | ................ | B64C 27/46 416/134 A |
| 4,715,589 A * | 12/1987 | Woerndle | .................. | B66C 1/18 267/148 |
| 5,074,753 A * | 12/1991 | Covington | .............. | B64C 27/48 416/141 |
| 5,181,829 A * | 1/1993 | Pancotti | ................... | B64C 27/48 416/134 A |
| 5,240,377 A * | 8/1993 | Farr | ....................... | B29C 70/083 416/224 |
| 5,482,584 A * | 1/1996 | Herrmann | ............... | F03D 1/065 156/172 |
| 2006/0204364 A1* | 9/2006 | Li | ......................... | B64C 27/473 416/241 R |

FOREIGN PATENT DOCUMENTS

| | | |
|---|---|---|
| GB | 1 267 571 | 3/1972 |
| GB | 2 025 339 | 1/1980 |
| GB | 2 131 373 | 6/1984 |

* cited by examiner

*Primary Examiner* — Richard Edgar
*Assistant Examiner* — Eldon Brockman
(74) *Attorney, Agent, or Firm* — Leason Ellis LLP (57) ABSTRACT

An aircraft rotor blade having a root portion having a through seat and designed for connection to the rotor; and a main portion extending from the root portion. The blade is produced by polymerizing an assembly having a main structure of composite material, and a composite material covering defining the outer surface of the blade. At the root portion, the main structure has a contoured block; and a lamina member extending about at least part of the block, and having a first part adhering to a first peripheral portion of the block, and a second part spaced apart from and facing a second peripheral portion of the block to form the seat; the lamina member having a pre-preg of continuous unidirectional fibers.

24 Claims, 9 Drawing Sheets

AIRCRAFT ROTOR BLADE AND RELATIVE FORMING METHOD

The present invention relates to an aircraft rotor blade and relative forming method.

The present invention is particularly advantageous, though not exclusively, for use in aircraft capable of hovering, such as helicopters—to which the following description refers purely by way of example or convertiplanes.

BACKGROUND OF THE INVENTION

Helicopter rotor blades made of composite materials are known. In the following description and Claims, 'composite material' is intended to mean non-metal materials produced by combining a heat-setting resin matrix and a disperse phase comprising reinforcing, e.g. glass, carbon or graphite, fibres.

Composite materials have numerous advantages over conventional metal materials they have excellent mechanical properties in relation to versatility, durability and specific weight—which is normally lower than that of metal materials; are highly resistant to fatigue and corrosion; and are structurally much more reliable, i.e. failure due to crack formation takes a relatively long time, thus enabling anomalies to be detected more easily.

Known blades normally comprise a root portion connected to the rotor hub; and a main portion defining the body of the blade itself. Blades of this sort are usually made by forming, in successive stages, a main structure comprising a number of composite material components joined using adhesive, and which may be either structural components or fillers, i.e. low-mechanical-performance components. The structural components are made by depositing one or more layers of continuous (long) woven fibres, e.g. of carbon or glass, preimpregnated with resin; whereas, in the filler components, the fibres are discontinuous (short). All the components are made independently in respective polymerization stages, and then joined using adhesive to form the main structure.

The main structure is then covered with further layers of composite material, normally glass fibres preimpregnated with resin, to form the outer skin of the blade; and the whole so formed is then polymerized in a mold to the final configuration.

A need is felt within the industry for fabrication solutions by which to reduce the risk of local failure at the blade root spreading rapidly to the surrounding areas and resulting in complete detachment of the blade from the rotor.

SUMMARY OF THE INVENTION

It is an object of the present invention to provide a simple, low-cost aircraft rotor blade designed to meet this demand.

According to the present invention, there is provided an aircraft rotor blade comprising a root portion having a through seat and designed for connection to the rotor; and a main portion extending from said root portion; said blade being produced by polymerizing an assembly comprising a main structure of composite material, and a composite material covering defining the outer surface of the blade;

the blade being characterized in that, at said root portion, said main structure comprises a contoured block; and a lamina member extending about at least part of said block, and having a first part adhering to a first peripheral portion of said block, and a second part spaced apart from and facing a second peripheral portion of the block to form said seat; said lamina member comprising a pre-preg of continuous unidirectional fibres.

According to the present invention, there is also provided a method of forming an aircraft rotor blade; said blade comprising a root portion having a through seat and designed for connection to the rotor, and a main portion extending from said root portion; said method comprising a step of polymerizing an assembly comprising a main structure of composite material, and a composite material covering defining the outer surface of the blade;

the method being characterized in that, at said root portion, said main structure is formed by:

forming a contoured block;
enclosing at least part of said block in a lamina member, so that a first part of said lamina member adheres to a first peripheral portion of said block, and a second part of the lamina member is spaced apart from and faces a second peripheral portion of said block to form said seat;

said lamina member comprising a pre-preg of continuous unidirectional fibres.

BRIEF DESCRIPTION OF THE DRAWINGS

A preferred embodiment of the present invention will be described by way of example with reference to the accompanying drawings, in which.

DETAILED DESCRIPTION OF THE INVENTION

Figure 1:
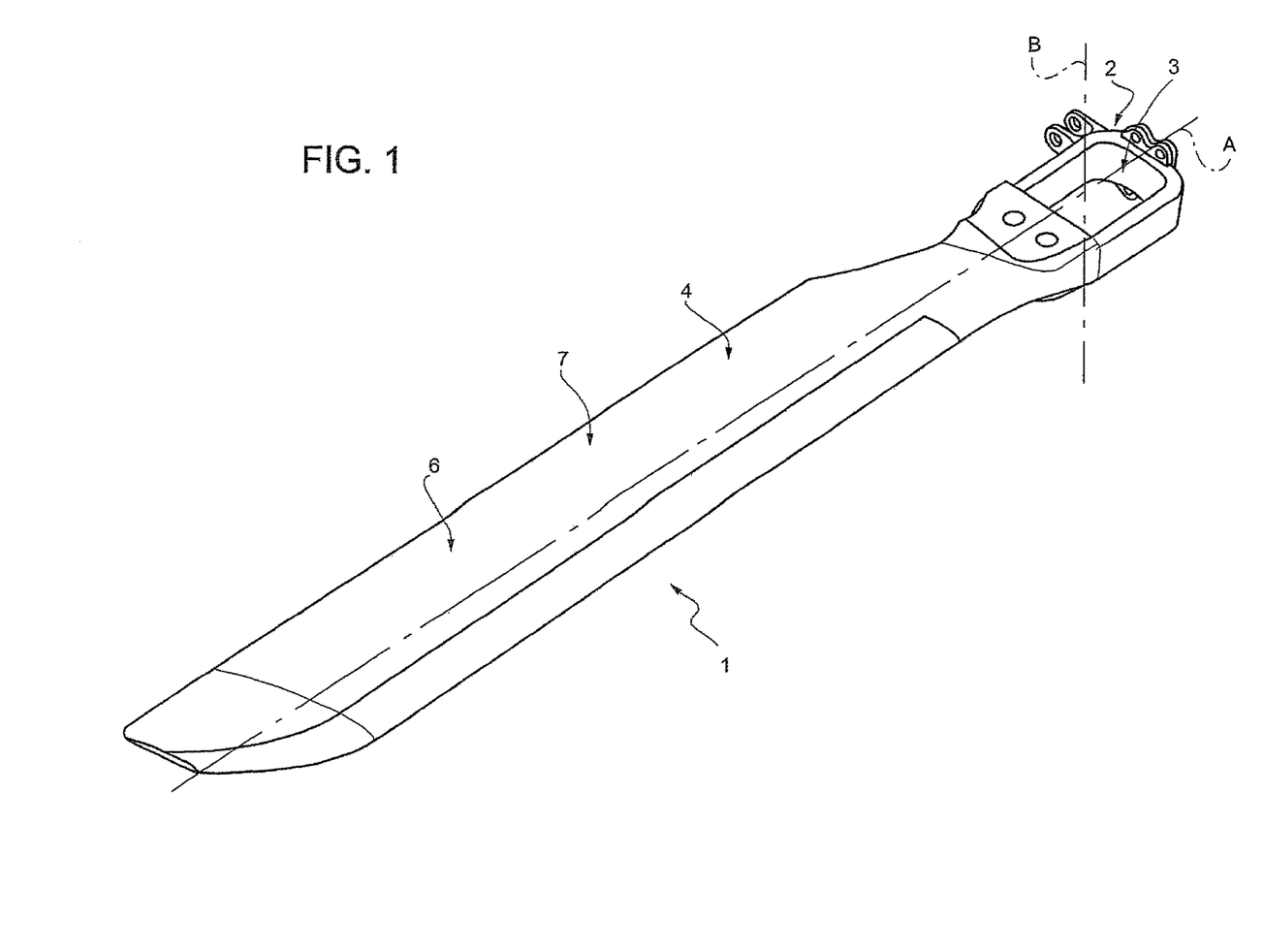
FIG. 1 shows a view in perspective of an aircraft, in particular a helicopter, rotor blade in accordance with the teachings of the present invention.

Number 1 in FIG. 1 indicates as a whole a blade for a known rotor (not shown) of an aircraft, in particular an aircraft capable of hovering, such as a known helicopter (not shown).

Blade 1 substantially comprises a root portion 2 having a through seat 3 and designed for connection to a known hub (not shown) of the rotor; and a main portion 4 extending from root portion 2 predominantly in a longitudinal direction A and defining the body of blade 1. Seat 3 has an axis B perpendicular to direction A.

Blade 1 is made of composite material using the forming method according to the present invention.

More specifically, blade 1 is produced by polymerizing an assembly comprising a main structure 5 (FIGS. 2 and 3) of composite material, and a composite material covering 6 (FIG. 1) defining the skin or outer surface 7 of blade 1.

Main structure 5 is produced as follows.

Figure 4:
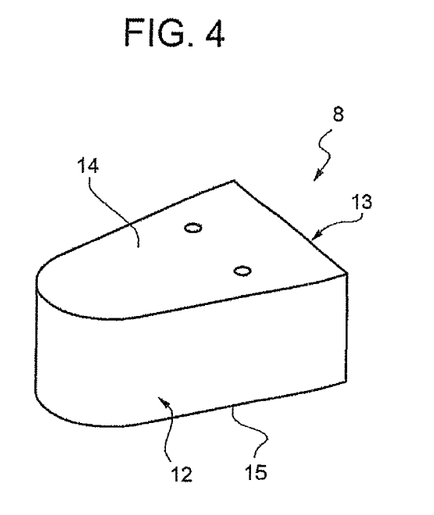
FIG. 4 shows a view in perspective of a component part of the FIG. 2 main structure of the blade root portion after a first forming step.
Figure 5:
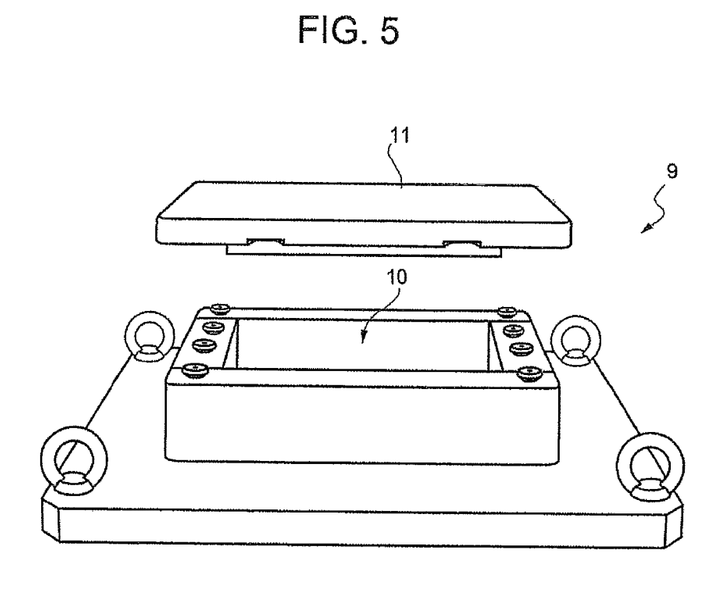
FIGS. 5 and 6 show two views in perspective, with parts removed for clarity, of a tool by which to produce the FIG. 4 component.
Figure 6:
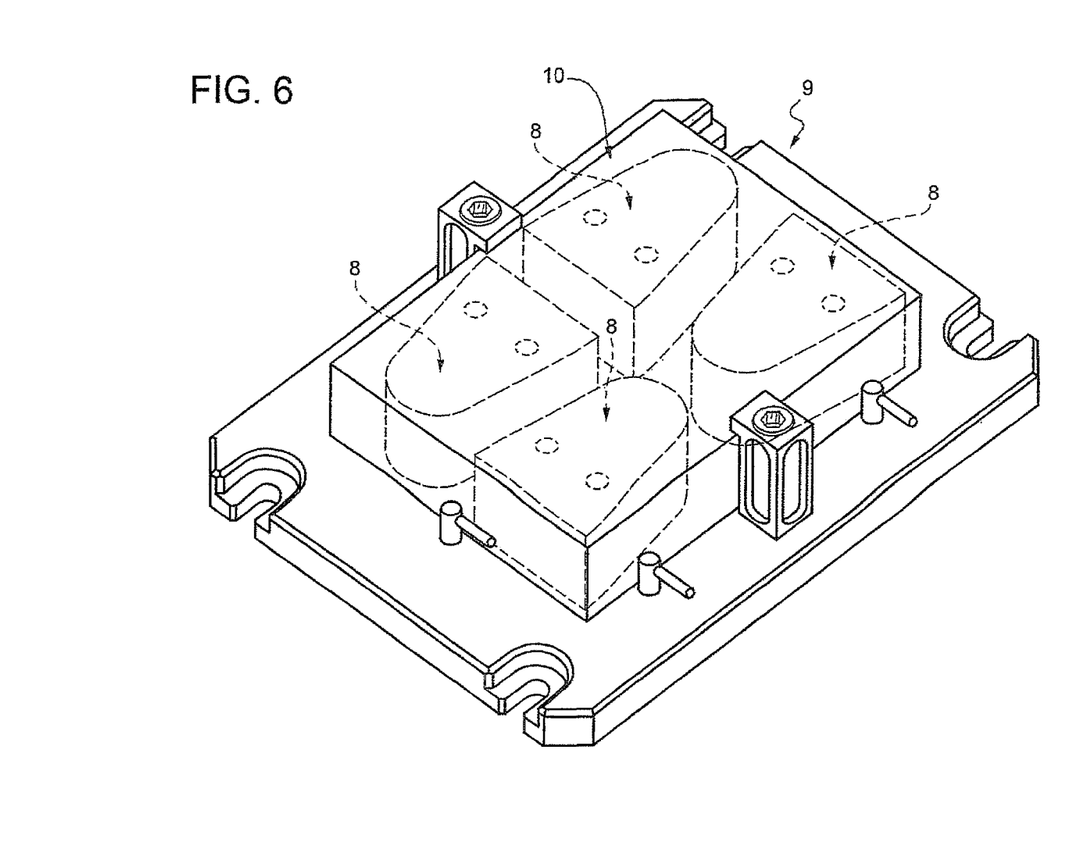

First, a contoured block 8 (FIG. 4) of composite material is made by polymerization using a tool 9 as shown in FIGS. 5 and 6.

More specifically, tool 9 defines an inner chamber 10, in which successive layers or laminae of a pre-preg of resin and fibres are arranged. In the example shown, the fibres are continuous, are woven in different predetermined weave patterns in the various layers, and are preferably graphite fibres.

As shown in FIG. 6, chamber 10 of tool 9 is designed to simultaneously produce four identical blocks 8, each by superimposing a number of layers of pre-preg, with an intermediate layer of adhesive between each two adjacent layers.

Once the pre-preg layers are arranged inside chamber 10, this is closed at the top by a lid 11 (FIG. 5), and the layers polymerized at predetermined temperature and pressure.

This results in a substantially prismatic block 8, which is bounded laterally by a curved, substantially C-shaped first peripheral surface 12, and by a flat second peripheral surface 13 transversely connecting the opposite free end edges of peripheral surface 12, and is bounded at the top and bottom by respective opposite flat faces 14 and 15.

Figure 7:
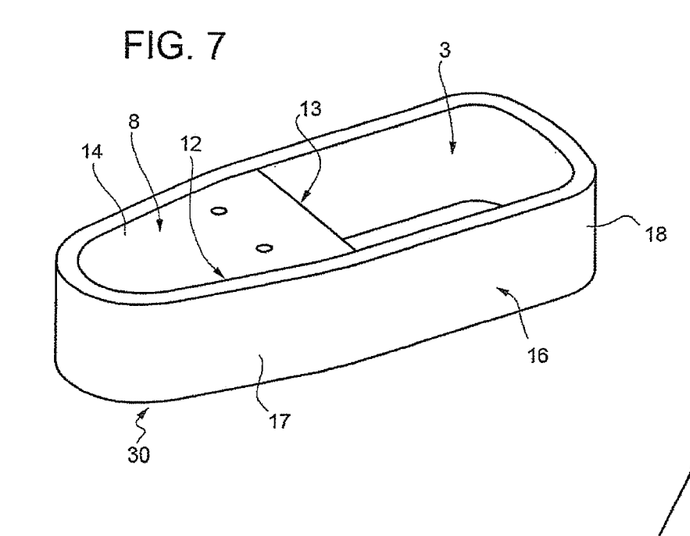
FIG. 7 shows a view in perspective of a base product of the FIG. 2 main structure of the blade root portion.
Figure 8:
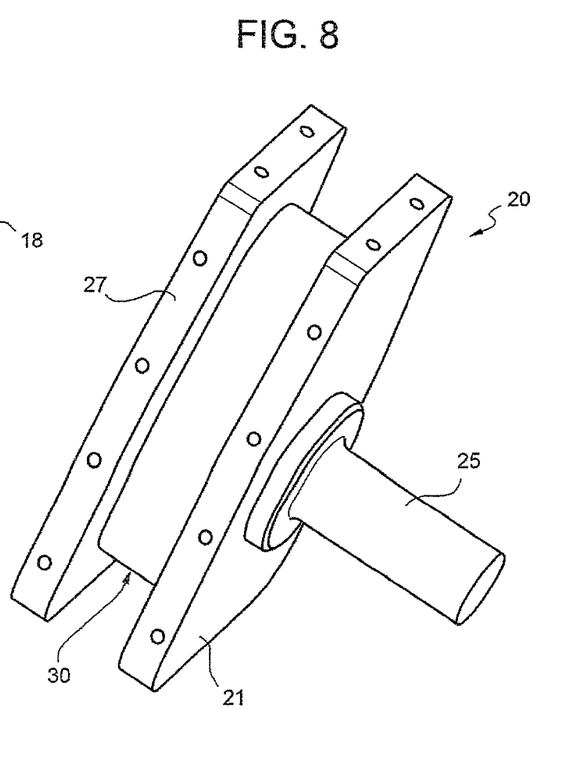
FIGS. 8 to 10 show three views in perspective, with parts removed for clarity, of a tool by which to form the FIG. 7 base product.

As shown in FIGS. 4 and 7, block 8 tapers from peripheral surface 13.

At this point, a lamina member of composite material, indicated as a whole by 16 (FIGS. 2, 3, 7, 8, 9, 11), is wrapped around block 8.

Lamina member 16 is preferably annular.

In the description and attached Claims, the term 'annular' is used in its widest sense to indicate an endless profile, and so includes not only circular, but also oval, elliptical or endless profiles of any shape.

Lamina member 16 is positioned with a first part 17 adhering to peripheral surface 12 of block 8, and with a second part 18 spaced apart from and facing peripheral surface 13 of block 8 to form seat 3 of root portion 2 of blade 1.

In the example shown, parts 17 and 18 are both C-shaped with their concavities facing.

Part 17 of lamina member 16 is fixed by adhesive to peripheral surface 12 of block 8.

Lamina member 16 is wrapped around block 8 using a tool 20 (FIGS. 8-10) substantially comprising a supporting plate 21 on which block 8 is positioned; and a forming assembly 22.

Figure 9:
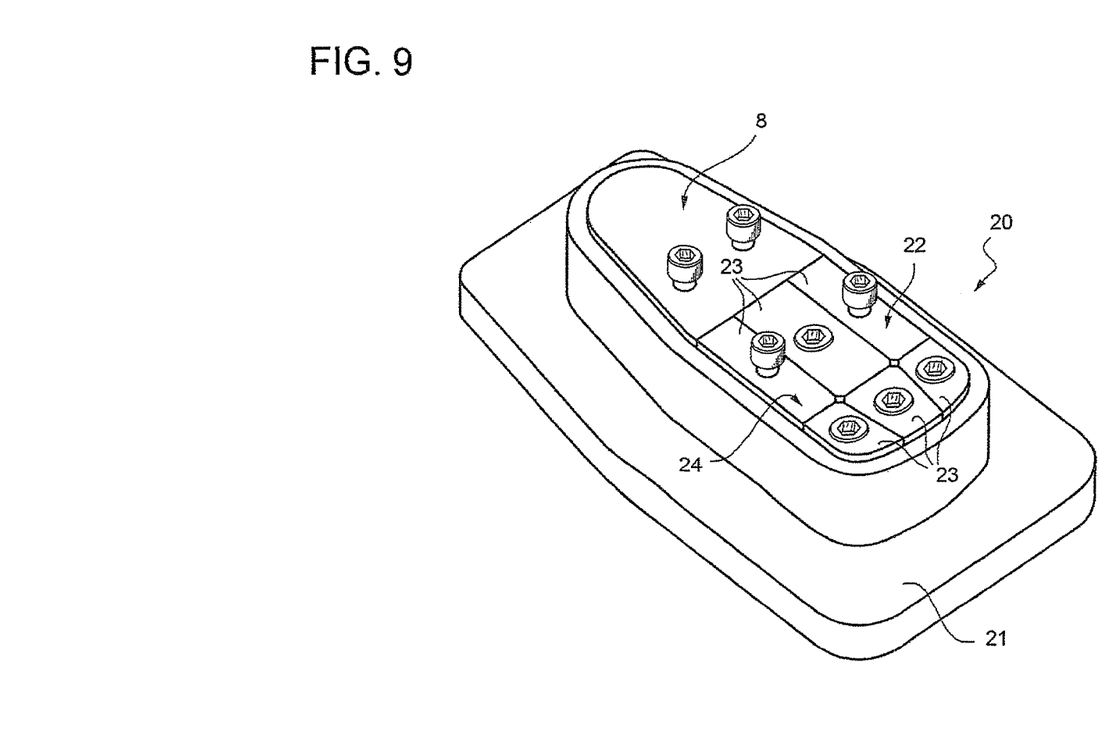
Figure 10:
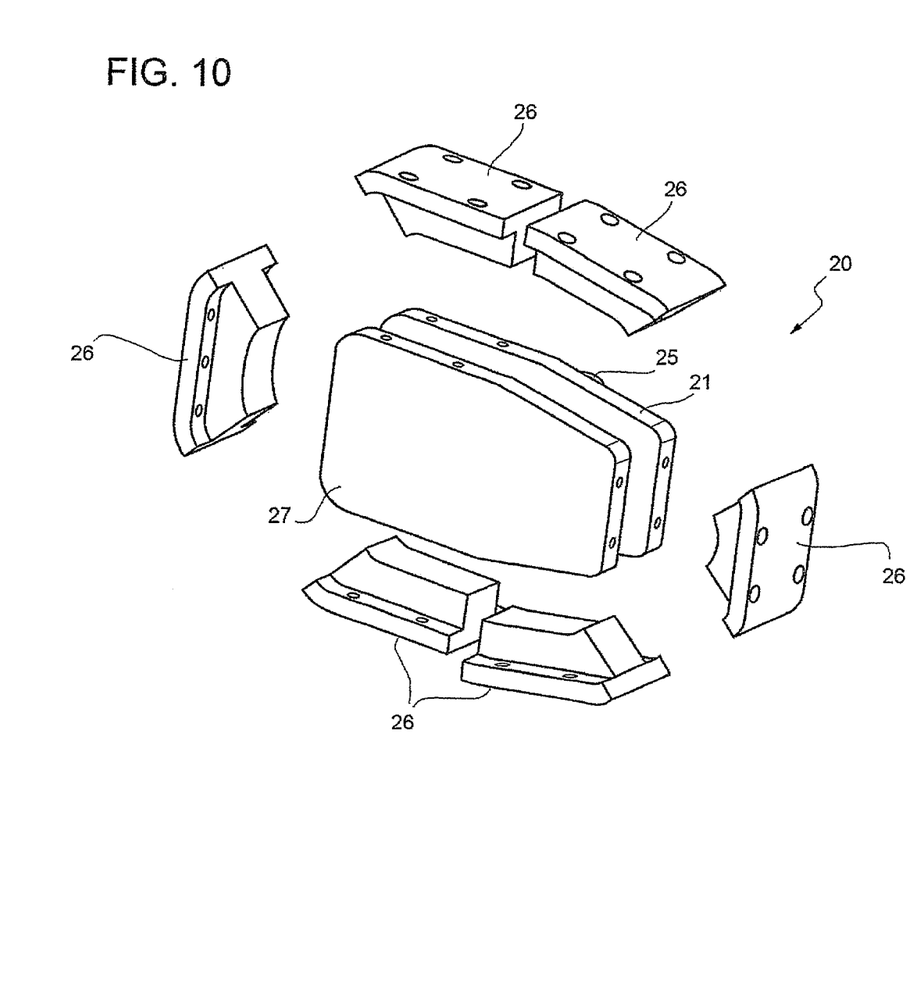

As shown in FIG. 9, forming assembly 22 comprises a number of metal inner shaping members 23, which are fixed to plate 21, adjacent to block 8, to form, with block 8, a sort of die 24 about which to wind lamina member 16.

In other words, shaping members 23 are shaped to form as a whole the inner profile of part 18 of lamina member 16.

To wind on the lamina member, plate 21 is fixed to a spindle 25 projecting perpendicularly from one side of plate 21. Rotation of spindle 25 rotates die 24, thus winding lamina member 16 fed onto die 24.

Tool 20 also comprises a number of outer shaping members 26 (FIG. 10) fixed to plate 21, around lamina member 16, to form the outer profile of lamina member 16; and a cover plate 27 (FIGS. 8 and 10) fixed to shaping members 26, parallel to and facing plate 21.

Lamina member 16 is advantageously made of a pre-preg of resin and continuous unidirectional, preferably graphite, fibres.

Once enclosed between plate 21, shaping members 23 and 26, and cover plate 27, block 8 and lamina member 16 are polymerized at predetermined temperature and pressure.

The result is the product indicated as a whole by 30 in FIG. 7.

Figure 11:
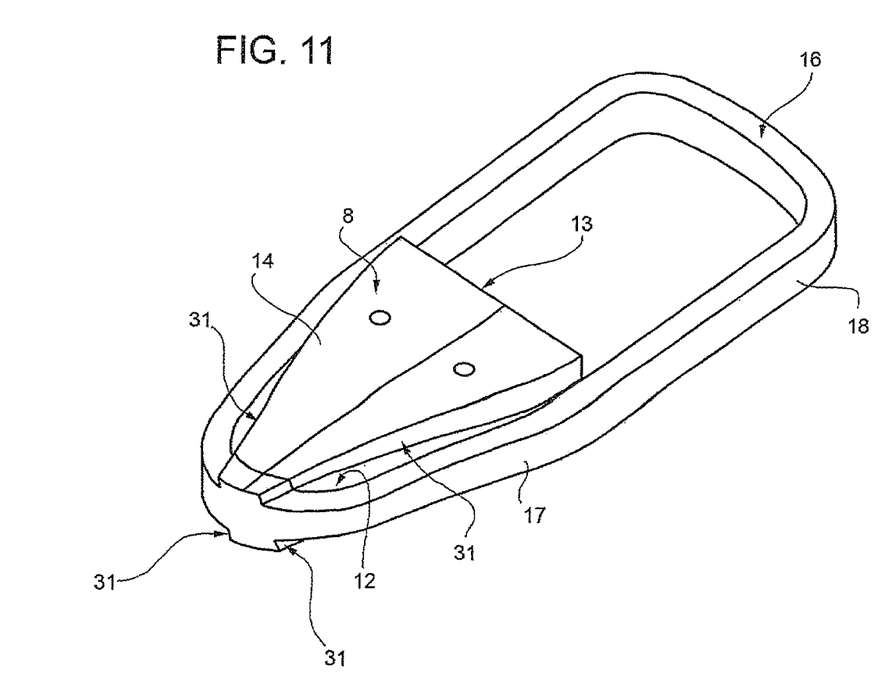
FIG. 11 shows a view in perspective of the FIG. 7 base product machined to its final shape.

At this point, product 30 is subjected to a further forming operation to reduce the height of lamina member 16 with respect to that of block 8, and to form respective steps 31 on opposite sides of both opposite faces 14 and 15 of block 8, as shown in FIG. 11.

The resulting product 30, defining root portion 2 of blade 1, is fixed to a known longitudinal member 32 (only shown partly in FIG. 3) extending in direction A.

Figure 3:
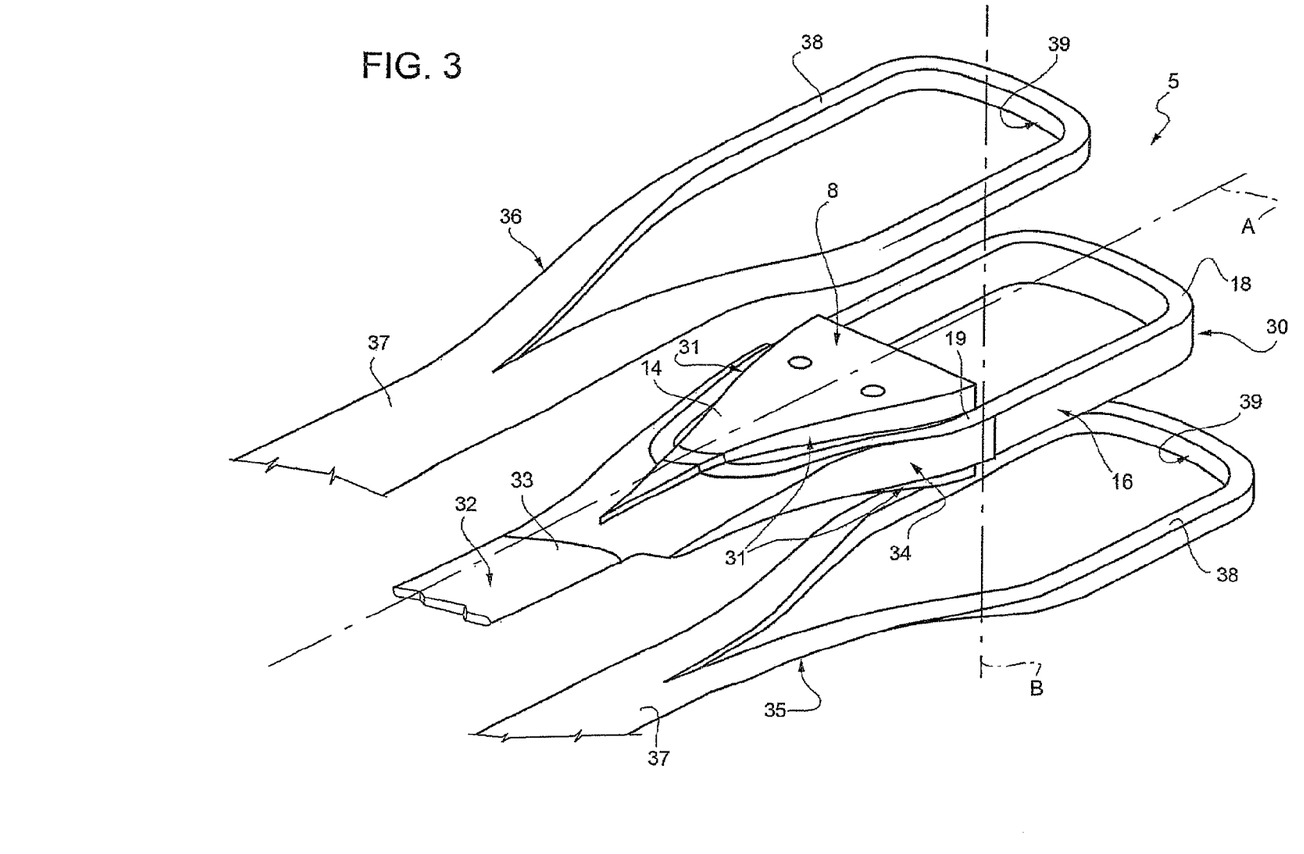
FIG. 3 shows an exploded view in perspective of the FIG. 2 main structure of the blade root portion.

More specifically, one end 33 of longitudinal member 32 is fixed—with the interposition of short-fibre composite material indicated 34 in FIG. 3—to part 17 of lamina member 16, on the opposite side to block 8.

In the example shown, material 34 is a pre-preg of resin and short glass fibres.

The assembly so formed is then fitted on opposite sides with a bottom hoop 35 and a top hoop 36 (FIGS. 2 and 3), both made of composite material—in the example shown, a pre-preg of resin and long, preferably graphite, fibres.

Figure 2:
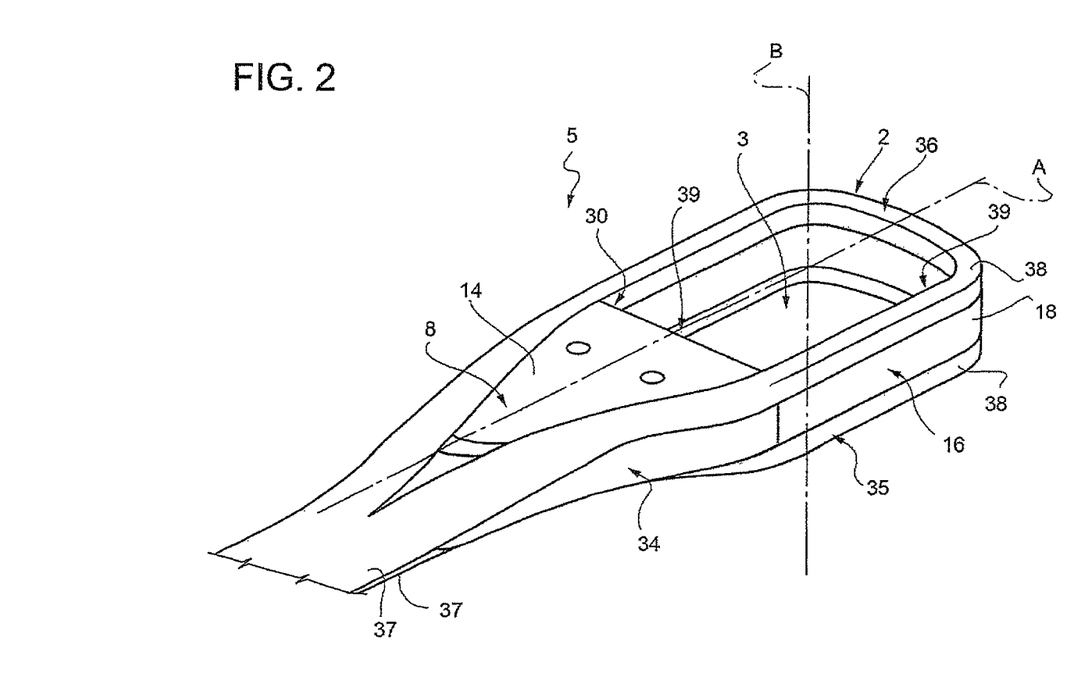
FIG. 2 shows a view in perspective of a main structure of a root portion of the FIG. 1 blade.

More specifically, each hoop 35, 36 comprises a main strip portion 37 terminating at one end with an annular portion 38 defining a through opening 39.

Hoops 35, 36 are positioned with main portions 37 adhering to opposite sides of longitudinal member 32, and with annular portions 38 engaging respective steps 31 of product 30 and coaxial with lamina member 16, so as to define seat 3.

In other words, lamina member 16 is sandwiched between hoops 35 and 36.

This completes main structure 5, to which successive layers of long-fibre pre-preg, preferably pre-pregs of resin and long glass fibres, are applied to form covering 6, and the whole is polymerized to obtain the finished blade 1.

The advantages of blade 1 and the relative forming method according to the teachings of the present invention will be clear from the above description.

In particular, enclosing block 8 in a lamina member made of a pre-preg of continuous unidirectional fibres minimizes the risk of blade 1 detaching from the rotor hub in the event of failure of either one of loops 35, 36. In fact, in the event of this happening, the load would be transmitted to lamina member 16 designed to withstand stress.

Block 8 is also designed to cooperate with lamina member 16 to withstand stress induced by failure of either one of hoops 35, 36.

In other words, the new solution devised for root portion 2 of blade 1 provides for 'structural redundancy' of the root portion area with no significant increase in weight.

Further structural redundancy is achieved by making hoops 35, 36 from pre-pregs of graphite fibres, which are more stress resistant than known solutions.

Clearly, changes may be made to blade 1 and the relative forming method as described and illustrated herein without, however, departing from the protective scope defined in the accompanying Claims.

For example, lamina member 16 need not necessarily be annular, i.e. may have a U-shaped profile, with the opposite end portions adhering to block 8.

Block 8 may even be made of short-fibre composite material.

And finally, block 8 and lamina member 16 may even be made of different, e.g. carbon or glass, fibres.

The invention claimed is:

1. An aircraft rotor blade (1) comprising;
   a root portion (2) having a through seat (3) and designed for connection to the rotor; and
   a main portion (4) extending from said root portion (2);
   said blade (1) being produced by polymerizing an assembly comprising a main structure (5) of composite material, and a composite material covering (6) defining the outer surface (7) of the blade (1);
   wherein, at said root portion (2), said main structure (5) comprises:
   a contoured block (8); and
   a lamina member (16) extending about at least part of said block (8), and having a first part (17) adhering to a first peripheral portion (12) of said block (8), and a second part (18) spaced apart from and facing a second peripheral portion (13) of the block (8) to form said seat (3);
   said lamina member (16) comprising a pre-preg of continuous unidirectional fibres; and
   wherein said lamina member (16) has an annular shape.

2. A blade as claimed in claim 1, wherein said block (8) is made of pre-preg layers superimposed with an interposition of adhesive and polymerized.

3. A blade as claimed in claim 2, wherein said pre-preg layers of said block (8) are continuous-fibre types.

4. A blade as claimed in claim 2, wherein said first part (17) of said lamina member (16) is fixed by adhesive to said first peripheral portion (12) of said block (8).

5. A blade as claimed in claim 1, wherein said main structure (5) comprises a first and second hoop (35, 36) made of composite material and applied to opposite sides of said block (8) and said lamina member (16).

6. A blade as claimed in claim 5, wherein said first and second hoop (35, 36) comprise pre-pregs of continuous fibres.

7. A blade as claimed in claim 6, wherein said fibres of said first and second hoop (35, 36) are fibres comprising carbon, or graphite fibres.

8. A blade as claimed in claim 5, wherein said lamina member (16) is sandwiched between said first and second hoop (35, 36).

9. A blade as claimed in claim 5, wherein said first and second hoop (35, 36) each have a through opening (39) with an edge aligned with said lamina member (16) to define said seat (3).

10. A blade as claimed in claim 1, wherein said main structure (5) comprises a longitudinal member (32), one end (33) of which is fixed, with the interposition of short-fibre composite material (34), to said first part (17) of said lamina member (16), on the opposite side to said block (8).

11. A blade as claimed in claim 1, wherein said fibres of said block (8) and/or said lamina member (16) are fibres comprising carbon, or graphite fibres.

12. A method of forming an aircraft rotor blade (1); said blade (1) comprising a root portion (2) having a through seat (3) and designed for connection to the rotor, and a main portion (4) extending from said root portion (2); said method comprising a step of polymerizing an assembly comprising a main structure (5) of composite material, and a composite material covering (6) defining the outer surface (7) of the blade (1);
    wherein, at said root portion (2), said main structure (5) is formed by:
    forming a contoured block (8);
    enclosing at least part of said block (8) in a lamina member (16), so that a first part (17) of said lamina member (16) adheres to a first peripheral portion (12) of said block (8), and a second part (18) of the lamina member (16) is spaced apart from and faces a second peripheral portion (13) of said block (8) to form said seat (3);
    said lamina member comprising a pre-preg of continuous unidirectional fibres;
    wherein said lamina member (16) is annular in shape and is wrapped about the whole of said block (8).

13. A blade as claimed in claim 1, wherein said lamina member is defined by a first continuous curved end and an opposing second continuous curved end, said first continuous curved end being adhered to the first peripheral portion of the block and the second continuous curved end partially defining the seat.

14. A method as claimed in claim 12, wherein said block (8) is produced by forming successive pre-preg layers superimposed with an interposition of adhesive, and by polymerizing the whole.

15. A method as claimed in claim 14, wherein said pre-preg layers of said block (8) are continuous-fibre types.

16. A method as claimed in claim 14, wherein said first part (17) of said lamina member (16) is fixed by adhesive to said first peripheral portion (12) of said block (8).

17. A method as claimed in claim 12, wherein the whole formed by said block (8) and said lamina member (16) is polymerized.

18. A method as claimed in claim 12, wherein forming said main structure (5) comprises the further step of applying a first and second hoop (35, 36) of composite material to opposite sides of said block (8) and said lamina member (16).

19. A method as claimed in claim 18, wherein said first and second hoop (35, 36) are made of pre-pregs of continuous fibres.

20. A method as claimed in claim 19, wherein said fibres of said first and second hoop (35, 36) are fibres comprising carbon, or graphite fibres.

21. A method as claimed in claim 18, wherein said lamina member (16) is sandwiched between said first and second hoop (35, 36).

22. A method as claimed in claim 12, wherein forming said main structure (5) comprises the further step of fixing one end (33) of a longitudinal member (32), with the interposition of short-fibre composite material (34), to said first part (17) of said lamina member (16), on the opposite side to said block (8).

23. A method as claimed in claim 12, wherein said fibres of said block (8) and/or said lamina member (16) are fibres comprising carbon, or graphite fibres.

24. A method as claimed in claim 12, wherein said lamina member is defined by a first continuous curved end and an opposing second continuous curved end, said first continuous curved end being adhered to the first peripheral portion of the block and the second continuous curved end partially defining the seat.

* * * * *

UNITED STATES PATENT AND TRADEMARK OFFICE
CERTIFICATE OF CORRECTION

PATENT NO. : 9,441,492 B2
APPLICATION NO. : 13/761299
DATED : September 13, 2016
INVENTOR(S) : Fabio Nannoni, Francesco Scapinello and Giuseppe Manenti It is certified that error appears in the above-identified patent and that said Letters Patent is hereby corrected as shown below:

On the Title Page

Item (57) in the Abstract, Line 13, the text "fibers" should be "fibres".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*